(12) United States Patent
Chappell et al.

(10) Patent No.: US 8,346,812 B2
(45) Date of Patent: Jan. 1, 2013

(54) INDEXING IN A RESOURCE DESCRIPTION FRAMEWORK ENVIRONMENT

(75) Inventors: Geoffrey Chappell, Belfast, ME (US); Derrish Repchick, Putney, VT (US)

(73) Assignee: Intellidimension, Inc., Brattleboro, VT (US)

( * ) Notice: Subject to any disclaimer, the term of this patent is extended or adjusted under 35 U.S.C. 154(b) by 316 days.

(21) Appl. No.: 12/910,413

(22) Filed: Oct. 22, 2010

(65) Prior Publication Data
US 2011/0099173 A1    Apr. 28, 2011

Related U.S. Application Data

(66) Substitute for application No. 61/254,355, filed on Oct. 23, 2009.

(51) Int. Cl.
G06F 7/00    (2006.01)
G06F 17/00   (2006.01)
G06F 17/30   (2006.01)

(52) U.S. Cl. .................. 707/793; 707/695; 707/711

(58) Field of Classification Search .................. 707/793, 707/695, 711
See application file for complete search history.

(56) References Cited

U.S. PATENT DOCUMENTS

| | | | |
|---|---|---|---|
| 7,318,055 B2 * | 1/2008 | Britton et al. | 1/1 |
| 7,650,460 B2 * | 1/2010 | Cheriton | 711/108 |
| 7,979,455 B2 * | 7/2011 | Krishnamoorthy et al. | 707/761 |
| 8,078,646 B2 * | 12/2011 | Das et al. | 707/802 |
| 8,166,074 B2 * | 4/2012 | Pettovello | 707/797 |
| 2008/0243770 A1 * | 10/2008 | Aasman | 707/2 |

* cited by examiner

*Primary Examiner* — Charles Lu
(74) *Attorney, Agent, or Firm* — Downs Rachlin Martin PLLC (57) ABSTRACT

Indexing in a resource description framework data system including a search key set of ranking relationships for the subject, predicate, and object of RDF statements, generation of a single nodal index including a node for each of the RDF statements, each node having a plurality of rank tracking indicators that include a position indicator representing the relative position of the RDF statement in each ranking relationship. A computer readable storage medium and a system for indexing a resource description framework data system are also provided.

22 Claims, 9 Drawing Sheets

INDEXING IN A RESOURCE DESCRIPTION FRAMEWORK ENVIRONMENT

RELATED APPLICATION DATA

This application claims the benefit of priority of U.S. Provisional Patent Application Ser. No. 61/254,355 filed Oct. 23, 2009, and titled "Indexing in a Resource Description Framework Environment", which is incorporated by reference herein in its entirety.

This application is also related to copending U.S. application Ser. No. 12/910,440 filed Oct. 22, 2010, and titled "Data Recovery System and Method in a Resource Description Framework Environment."

FIELD OF THE INVENTION

The present invention generally relates to the field of data management indexing. In particular, the present invention is directed to indexing in a resource description framework environment.

BACKGROUND

Resource Description Framework, commonly referred to as RDF, is a family of World Wide Web Consortium specifications. RDF utilizes resource description framework statements to represent resources in a data model. Examples of resources that can be represented in an RDF data model include, but are not limited to, resources from the World Wide Web, resources from one or more databases, and any combinations thereof. An RDF statement typically includes a subject, a predicate, and an object. A subject identifies a particular resource. An object identifies something about a subject. A predicate identifies a relationship between the subject and the object. RDF data systems can frequently contain very large amounts of data such that indexing the data for query application can present problems such as large indexes and slow query application times.

SUMMARY OF THE DISCLOSURE

In one embodiment, a computer implemented method of indexing a resource description framework data system is provided. The method includes identifying a plurality of resource description framework data statements to be indexed within a resource description framework data system; determining a search key set of a plurality of ranking relationships for the subject, predicate, and object for the plurality of resource description framework data statements; generating a single nodal index including a node for each of the plurality of resource description framework data statements, each node including an identifier of the node, and assigning to each node of the single nodal index a plurality of rank tracking indicators, the plurality of rank tracking indicators for each node including a position indicator for each of the plurality of ranking relationships, each of the position indicators representing the relative position of the corresponding resource description framework data statement in the corresponding ranking relationship, the single nodal index including the relative position of each node in all of the plurality of ranking relationships in the search key set.

In another embodiment, a machine readable storage medium containing machine executable instructions for implementing a method of indexing a resource description framework data system is provided. The instructions include a set of instructions for identifying a plurality of resource description framework data statements to be indexed within a resource description framework data system; a set of instructions for determining a search key set of a plurality of ranking relationships for the subject, predicate, and object for the plurality of resource description framework data statements; a set of instructions for generating a single nodal index including a node for each of the plurality of resource description framework data statements, each node including an identifier of the node, and a set of instructions for assigning to each node of the single nodal index a plurality of rank tracking indicators, the plurality of rank tracking indicators for each node including a position indicator for each of the plurality of ranking relationships, each of the position indicators representing the relative position of the corresponding resource description framework data statement in the corresponding ranking relationship, the single nodal index including the relative position of each node in all of the plurality of ranking relationships in the search key set.

In yet another embodiment, an indexing system for indexing a resource description framework data system is provided. The indexing system includes means for identifying a plurality of resource description framework data statements to be indexed within a resource description framework data system; means for determining a search key set of a plurality of ranking relationships for the subject, predicate, and object for the plurality of resource description framework data statements; means for generating a single nodal index including a node for each of the plurality of resource description framework data statements, each node including an identifier of the node, and means for assigning to each node of the single nodal index a plurality of rank tracking indicators, the plurality of rank tracking indicators for each node including a position indicator for each of the plurality of ranking relationships, each of the position indicators representing the relative position of the corresponding resource description framework data statement in the corresponding ranking relationship, the single nodal index including the relative position of each node in all of the plurality of ranking relationships in the search key set.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

A method for indexing and optimizing data recovery in a Resource Description Framework environment is provided. An RDF statement may include additional information other than a subject, predicate, and object. Typically, an RDF statement is referred to as a "triple." It is possible that an additional data element, such as the context and/or source of the RDF statement, also be included for each RDF statement. In one such example, an RDF statement may be referred to as a "quad" or "quadruple." Other variations of an RDF statement are contemplated.

Data values for the subject, predicate, and object of an RDF statement may take a variety of general forms. Examples of such forms include, but are not limited to, a Uniform Resource Identifier ("URI"), a literal data value, a blank value, and any combinations thereof. In one example, the subject, predicate, and object of an RDF statement each utilize the same form of data value. In another example, each of the subject, predicate, and object of an RDF statement utilize any one of the example data forms discussed above. The subject of an RDF statement is typically in the form of a Uniform Resource Identifier ("URI"). Other forms are also possible, such as a blank node or a literal. A URI can represent any resource. In one aspect, a URI may be represented as an addressable location of a resource on a network. Examples of networks for which a URI may represent a resource include, but are not limited to, the Internet (e.g., the World Wide Web), a local area network, a wide area network, a directly connected database, and any combinations thereof. In one such example, a URI may take the form of an identifier beginning with the "http:" prefix. A URI may also utilize the "http:" prefix (or similar variant, such as "shttp:") where the URI does not actually represent a location of a network accessible resource. The predicate and/or object of an RDF statement may also be represented as a URI. Literal data statements may also be used for one or more of a subject, predicate, and object of an RDF statement. In one example, an object of an RDF statement is a literal data statement.

An RDF statement and its data values may be encoded in any of a variety of serialization or file formats. Examples of serialization formats for an RDF statement include, but are not limited to, an XML format, a Notation 3 ("N3") format, a Turtle format, an N-Triples format, and any combinations thereof. A serialization format may utilize a known set of URI's to identify aspects of a subject, predicate, and/or object.

An original RDF statement that represents a resource itself may have additional RDF statements that refer back to the original RDF statement as being its own resource. In one such example, the original RDF statement may be assigned a URI to which other RDF statements may refer. Examples of additional RDF statements that may be made referring to an original RDF statement include, but are not limited to, an RDF statement referring to the original RDF statement's subject as a resource, an RDF statement referring to the original RDF statement's predicate as a resource, an RDF statement referring to the original RDF statement's object as a resource, and any combinations thereof.

Figure 1:
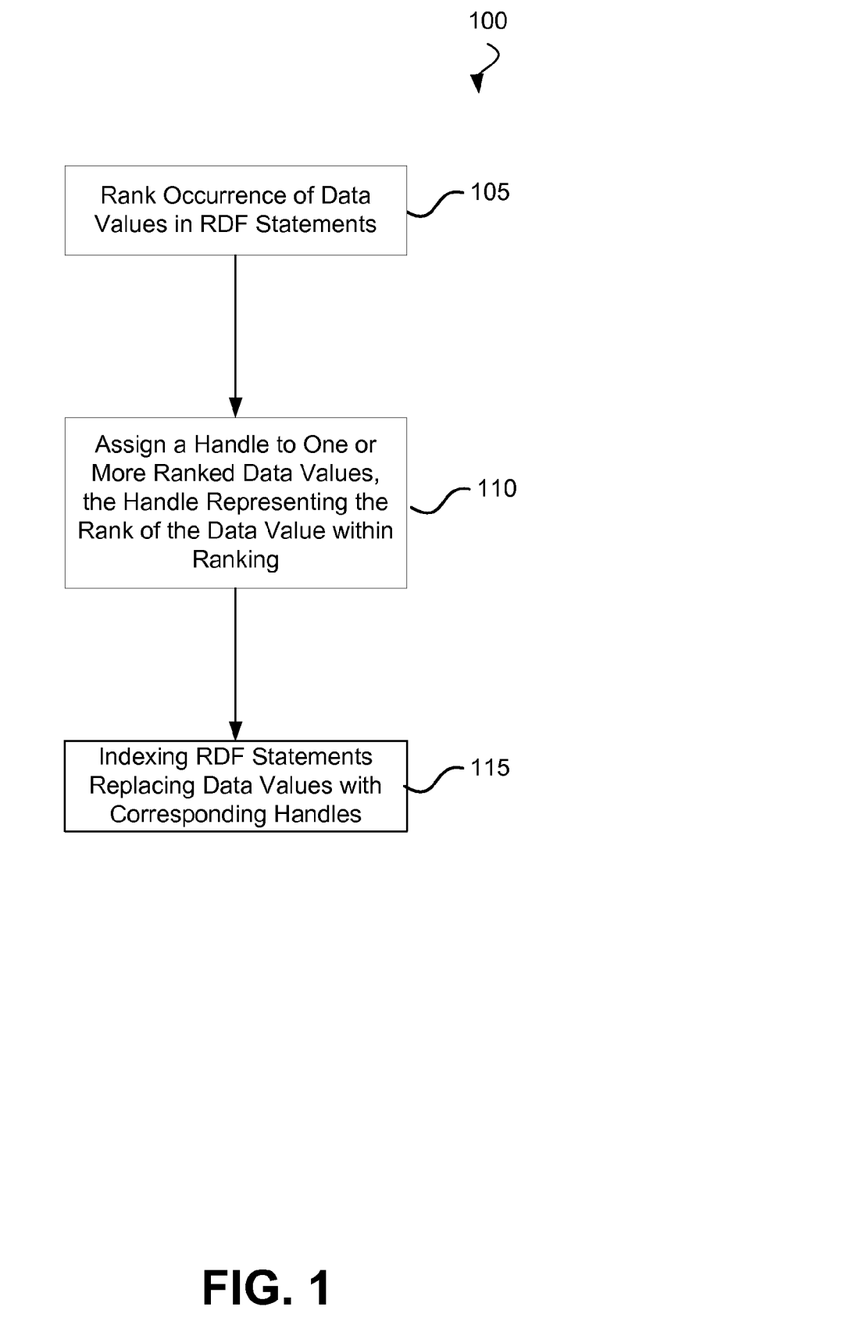
FIG. 1 illustrates one exemplary implementation of a method for optimizing data recovery in an RDF environment.

FIG. 1 illustrates one implementation of a method 100 for optimizing data recovery in an RDF environment. At stage 105, data values from a plurality of RDF statements are ranked according to the frequency of occurrence of the data values in the RDF statements. Example data values to consider in ranking include, but are not limited to, data values from the subject location of the RDF statements, data values from the predicate location of the RDF statements, data values from the object location of the RDF statements, and any combinations thereof. In one example, data values from all of the subject, predicate, and object locations are included in ranking. In another example, data values from the subject location are included in ranking. In yet another example, the frequency of occurrence of data values from subject locations that occur as the object and/or predicate of other RDF statements is utilized in ranking the data values.

Ranking may also be modified by taking into consideration other factors. Examples of other factors to consider include, but are not limited to, tie breaking procedures, rank weighting based on one or more predetermined factors, location of data values in original set of RDF statements, and any combinations thereof. Example ways to break ties in a ranking include, but are not limited to, alphabetical arrangement, application of a weighting procedure, and any combinations thereof. Example weighting procedures include, but are not limited to, assigning a ranking weight based on the data value of a subject, predicate, and/or object (e.g., assigning a higher ranking value to a subject data value that is the object of another RDF statement with a particular predicate data value and a lower ranking value to a subject data value that is the object of another RDF statement with a different predicate data value); assigning a ranking weight based on the form of a data value (e.g., assigning a higher ranking value to a related data value that is a URI); and any combinations thereof.

Table 1 illustrates an example set of RDF statements. The first three RDF statements in the table include URI data value's for the subject and predicate and a literal data value for the object. The remaining RDF statements in the table include URI data values for each of the subject, predicate, and object. Table 2 illustrates one example of a result of ranking data values from the RDF statements in Table 1. In this example, the data values of the subject locations of the RDF statements are ranked according to the frequency of the data values in the predicate and objects of other RDF statements. The subject data value "<http://uspres.x/gwashington>" appears three times in the objects of other RDF statements. The subject data value "<http://presinfo.x/geowash>" appears two times in the objects of other RDF statements. The subject data value "<http://history-usa.x/george_washington>" occurs once in the objects of other RDF statements. All other subject data values do not occur in the predicate or object of other RDF statements in this example.

TABLE 1

Example RDF Statements
RDF Statements (Input Data)

| Subject (s) | Predicate (P) | Object (O) |
|---|---|---|
| <http://uspres.x/gwashington> | <http://ontology.z/Name> | "George Washington" |
| <http://presinfo.x/geowash> | <http://ontology.z/Name> | "George Washington" |
| <http://history-usa.x/george_washington> | <http://ontology.z/Name> | "George Washington" |
| <http://usnews.x/article/2009/09/01> | <http://ontology.a/President> | <http://uspres.x/gwashington> |
| <http://encyclopedia.x/vol1/uspresidents> | <http://ontology.b/FirstPresident> | <http://uspres.x/gwashington> |

TABLE 1-continued

Example RDF Statements
RDF Statements (Input Data)

| Subject (s) | Predicate (P) | Object (O) |
|---|---|---|
| <http://whitehouse.x/presidents> | <http://ontology.c/USPresident> | <http://uspres.x/gwashington> |
| <http://johndoe.x/blog/2009/06/15> | <http://ontology.d/Person> | <http://presinfo.x/geowash> |
| <http://uscurrency.x/onedollarbill/> | <http://ontology.e/PortraitOf> | <http://presinfo.x/geowash> |
| <http://usrevolution.x/> | <http://ontology.f/General> | <http://history-usa.x/george_washington> |

TABLE 2

Example RDF Statement Data Value Ranking
Subject Values (Rank Order)

<http://uspres.x/gwashington>
<http://presinfo.x/geowash>
<http://history-usa.x/george_washington>
<http://encyclopedia.x/vol1/uspresidents>
<http://johndoe.x/blog/2009/06/15>
<http://uscurrency.x/onedollarbill/>
<http://usnews.x/article/2009/09/01>
<http://usrevolution.x/>
<http://whitehouse.x/presidents>

In this example, as shown in Table 2, the "<http://uspres.x/gwashington>", "<http://presinfo.x/geowash>", and "<http://history-usa.x/george_washington>" data values are ranked based on their frequency of occurrence. The remaining data values are tied with an occurrence frequency of zero. In this example, the tie is broken by arranging the remaining data values in rank based on an alphabetical arrangement.

Referring again to FIG. 1, at stage 110, a handle value that is directly related to the ranking of the data value is assigned to one or more of the ranked data values. One or more of the data values of a group of RDF statements that are not ranked at stage 105 may also be assigned handle values. It should be noted that handle values do not need to be assigned to all data values in a group of RDF statements. A handle value is a value that replaces the original data value with another statement that is usually smaller in data size. Using handle values to store RDF statements can minimize the computing resources required to manage the RDF statements and/or increase the speed of retrieval of information from the RDF statements. This may be a particularly significant decrease in resources required when the number of RDF statements is very large and/or the repetition of particular data values across the RDF statement is large.

A relationship between each data value and the assigned handle value is maintained in a library. Example ways to maintain the relationship between the data value and the handle value include, but are not limited to, a cross-over table, in a memory, and any combinations thereof.

Table 3 illustrates an example assignment of handle values that directly represent the ranking values for the data values from the example discussed above in Tables 1 and 2. In this example, numerical handle values 1 to 9 are assigned to the data values that were ranked according to the example of Table 2. Here, the remaining data values from the predicates and objects of the RDF statements in Table 1 are also assigned handle values. Assignment of an order to the handle values for previously unranked data values may occur in a variety of ways. Example ways to assign handle values to unranked data values include, but are not limited to, alphabetical arrangement, original location in RDF statements, assignment based on a predetermined weighting procedure, assignment based on order of encountering new values as RDF statements are considered in the ranking/handle assignment process, and any combination thereof. In this example, the data values that were not ranked according to Table 2 are assigned sequential handle values based on the location of each unranked data value in the RDF statements in Table 3 (e.g., based on the original data arrangement of the RDF statements).

TABLE 3

Example Handle Assignment
Handle Table

| Handle ID | Value |
|---|---|
| 1 | <http://uspres.x/gwashington> |
| 2 | <http://presinfo.x/geowash> |
| 3 | <http://history-usa.x/george_washington> |
| 4 | <http://encyclopedia.x/vol1/uspresidents> |
| 5 | <http://johndoe.x/blog/2009/06/15> |
| 6 | <http://uscurrency.x/onedollarbill/> |
| 7 | <http://usnews.x/article/2009/09/01> |
| 8 | <http://usrevolution.x/> |
| 9 | <http://whitehouse.x/presidents> |
| 10 | <http://ontology.z/Name> |
| 11 | "George Washington" |
| 12 | <http://ontology.a/President> |
| 13 | <http://ontology.b/FirstPresident> |
| 14 | <http://ontology.c/USPresident> |
| 15 | <http://ontology.d/Person> |
| 16 | <http://ontology.e/PortraitOf> |
| 17 | <http://ontology.f/General> |

At stage 115 of FIG. 1, the RDF statements are indexed with one or more of the data values replaced by the corresponding rank-based handles. Various indexing processes for RDF statements are known. Example indexing processes for RDF statements include, but are not limited to, a self balancing binary search tree (e.g., a Red-Black Tree), a hash table, and any combinations thereof. Examples of indexing using a self balancing binary search tree are discussed in more detail below. In organizing an index of RDF statements having handles assigned based on ranking of data values, the higher ranked handles are organized in the index at a higher location. RDF statements at relatively higher locations in the index can be retrieved from the index more quickly. In one exemplary aspect, indexing and storing RDF statements with handle values that are directly related to the rank of the corresponding data values may increase the speed at which relevant data may be queried from the RDF statements. In one such example, a partial query can be conducted of a set of RDF statements where the partial search results include information that ranks higher based on the ranking system employed to rank the data values of the RDF statements.

Figure 2:
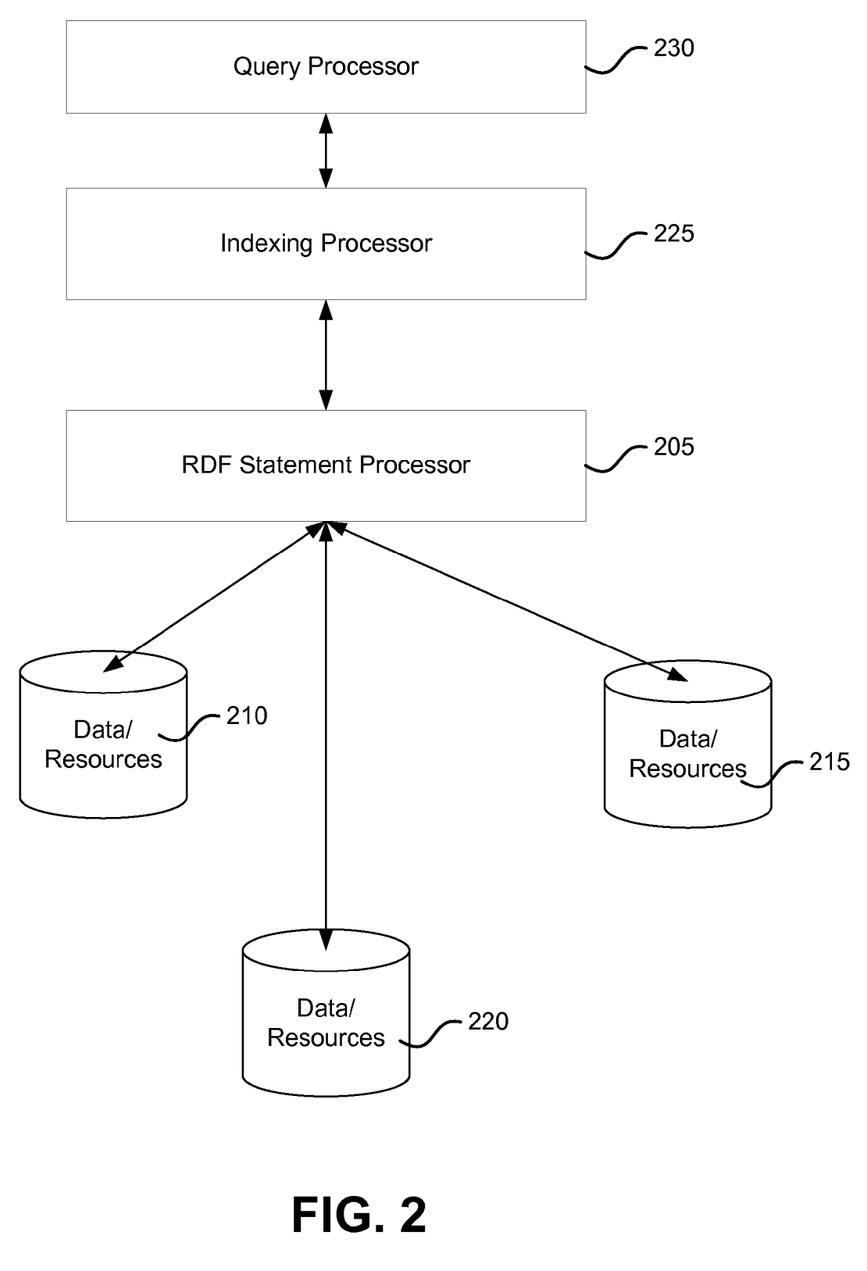
FIG. 2 illustrates one exemplary implementation of a resource description framework data system.

FIG. 2 illustrates one implementation of a resource description framework data system 200 in which a method of indexing and/or optimizing data retrieval as described herein (e.g., method 100 of FIG. 1) may be implemented. RDF data system 200 includes an RDF statement processor 205. RDF statement processor 205 connects to data resources in one or more databases. RDF statement processor 205 is shown connected to three databases 210, 215, 220. It is contemplated that an RDF statement processor 205 may be connected to any one or more databases for access to data resources. The three databases 210, 215, 220 are illustrated for exemplary purposes only. Examples of a database having data resources for access by an RDF data system include, but are not limited to, a web page, a website, a search engine data store, a data store having RDF statements, a relational database, a hierarchical database, an industrial data store (e.g., a process monitoring data store), a live data feed (e.g., a data monitoring feed from an industrial asset, such as motorized equipment, a pump, a well, a production line, etc.), a satellite imagery data store, a media rights management data store (e.g., data tracking ownership and royalty payments associated with intellectual and physical media), a media asset data store (e.g., data related to multimedia assets), and any combinations thereof. In one example, data resources accessed by RDF statement processor 205 are in RDF statement form. In another example, data resources accessed by RDF statement processor 205 are in a form other than RDF statement form. In yet another example, some data resources accessed by RDF statement processor 205 are in RDF statement form and other data resources accessed by RDF statement processor 205 are in a form other than RDF statement form.

RDF statement processor 205 includes appropriate connections to the one or more databases 210, 215, 220 for accessing the data resources thereon. Example connections include, but are not limited to, a direct wired connection (e.g., via an external cable, via an internal machine connection to a storage device), a wired network connection, a wireless network connection, and any combinations thereof. Example network connections include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. Additional exemplary aspects of example connections for RDF statement processor 205 are discussed below with respect to the exemplary machine of FIG. 9.

RDF statement processor 205 may include appropriate hardware and specially configured machine executable instructions for forming RDF statements where data resources of one or more databases 210, 215, 220 are not already in the desired RDF format. As discussed above, there are various processes for placing data resources in RDF statements using various serialization formats. A person of ordinary skill will recognize various ways to convert data resources to an RDF statement format using RDF statement processor 205.

RDF statement processor 205 also includes appropriate hardware and specially configured machine executable instructions for identifying desired data values of RDF statements for ranking, ranking the data values, and assigning handle values to data values based on a direct relationship to the ranking. In one example, RDF statement processor 205 is associated with a memory element that includes stored instructions for determining which data values to rank, the procedure for ranking data values, the procedure for assigning handle values to ranked data values, and a procedure for assigning handle values to unranked data values.

RDF data system 200 also includes an indexing processor 225. Indexing processor 225 includes appropriate connection to RDF statement processor 205 for accessing information including information related to RDF statements, information related to the ranking of data values of RDF statements, and information related to the handles assigned to data values based on ranking. Indexing processor 225 also includes appropriate hardware and specially configured machine executable instructions for indexing the RDF statements. As discussed briefly above, indexing of RDF statements may be done by any one or more of a variety of known procedures. Example indexing processes for RDF statements include, but are not limited to, a self balancing binary search tree (e.g., a Red-Black Tree), hash table, and any combinations thereof. Indexing processor 225 generates one or more indices of RDF statements using handles, at least some of which are assigned based on the ranking of data values of the RDF statements as discussed herein.

RDF statement processor 205 and/or indexing processor 225 may include appropriate hardware and specially configured machine executable instructions for replacing data values of RDF statements with corresponding handle values as discussed above with respect to FIG. 1. RDF statement processor 205 and indexing processor 225 have associated therewith one or more memory elements for storing information required to implement one or more of the methodologies and/or embodiments described herein. In one example, the one or more memory elements may be part of each of RDF statement processor 205 and indexing processor 225, shared by both RDF statement processor 205 and indexing processor 225, separate from but connected to one or more of RDF statement processor 205 and indexing processor 225, and any combinations thereof. Examples of a memory element include, but are not limited to, a storage device, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. The one or more memory elements may include volatile and/or nonvolatile machine readable media. Additional aspects of example implementations of a memory element are discussed further below with respect to the exemplary machine of FIG. 9. Information for storage using the one or more memory elements includes, but is not limited to, information related to a plurality of RDF statements for indexing, information related to ranking of data values from RDF statements, information related to assignment of ranked handles to data values, information related to handles assigned to unranked data values, information related to the indexing of RDF statements, and any combinations thereof.

RDF data system 200 also includes a query processor 230. Query processor 230 includes appropriate connection to one or more memory elements of RDF data system 200 that include one or more indices of RDF statements generated by indexing processor 225. Query processor 230 may also include one or more memory elements and/or be associated with one or more memory elements for storing information including one or more indices of RDF statements and/or machine executable instructions for performing a query of information related to the RDF statements. Various query processes for querying RDF statements (e.g., including RDF statements indexed with handle values) are known. An example of a query process is SPARQL (the W3C standard query language for RDF).

Query processor 230 may include one or more input devices and/or display devices for receiving one or more query parameters or other information for conducting one or more queries. Query processor 230 may also include one or more output devices and/or display devices for outputting one or more query results based on one or more queries of information in RDF statements. Example input, output, and display devices are discussed in greater detail below with respect to FIG. 9.

Figure 9:
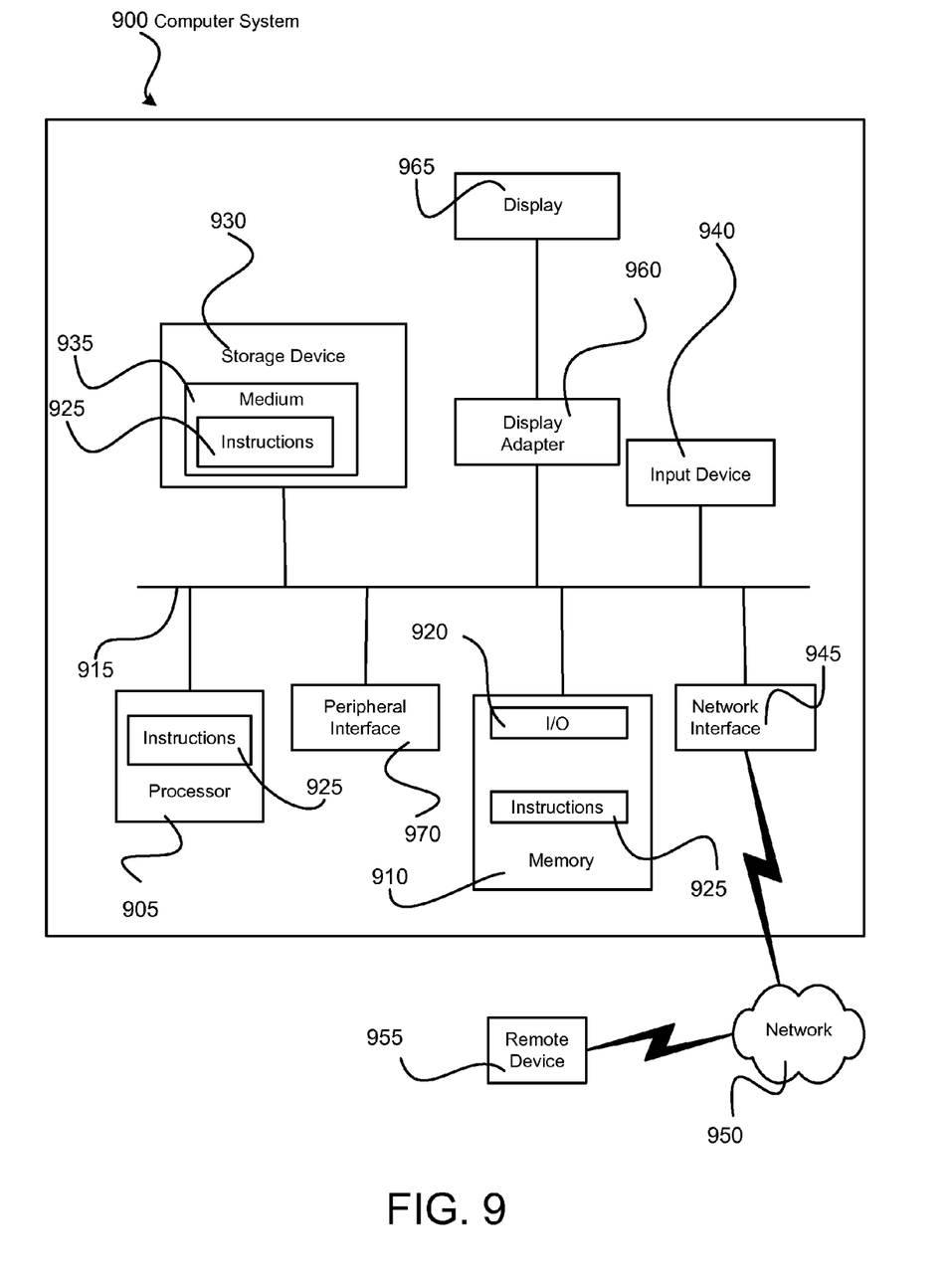
FIG. 9 illustrates an exemplary implementation of an example computing device.

Any one or more of the functionalities of the components of RDF data system 200 may be implemented utilizing one or more machines. FIG. 9 illustrates an exemplary machine and example components thereof for performing various operations.

Figure 3:
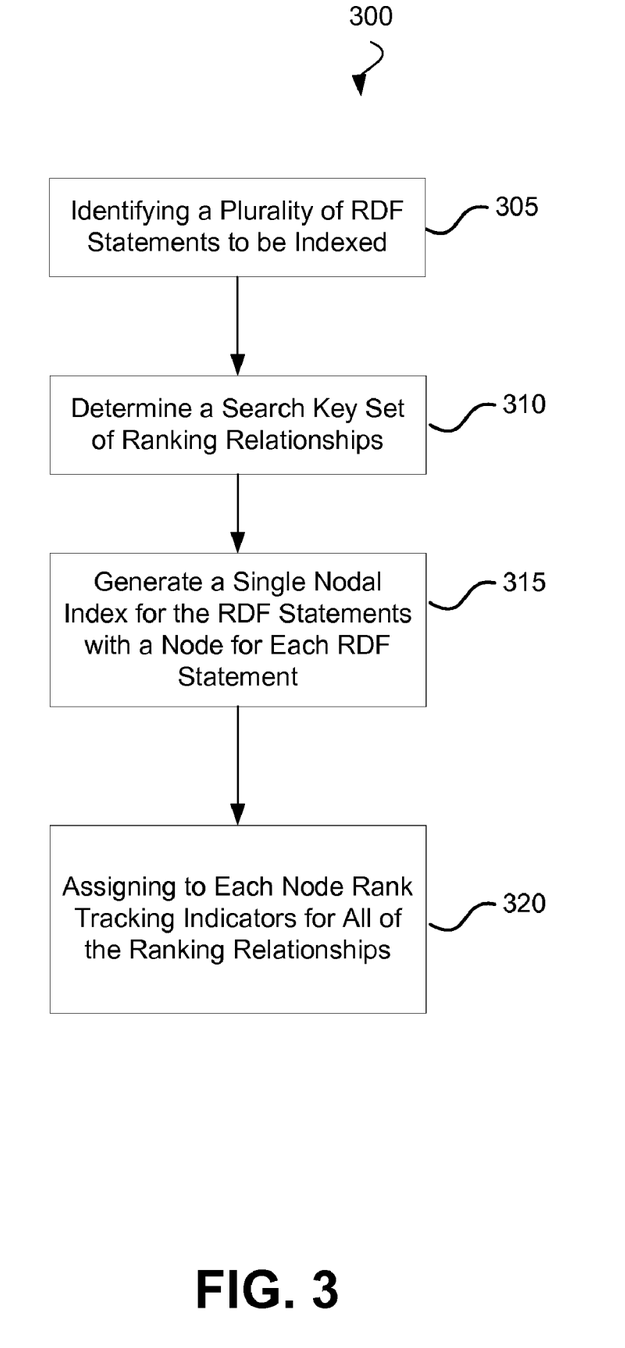
FIG. 3 illustrates one exemplary implementation of a method of indexing a resource description framework data system.

FIG. 3 illustrates one exemplary implementation of a method 300 of indexing RDF statements in an RDF data system. In one example, method 300 may be utilized by indexing processor 225 of FIG. 2 to perform an indexing process, such as in stage 115 of method 100. At stage 305, method 300 includes identifying a plurality of RDF statements to be indexed within an RDF data system. In one example, one or more of the RDF statements includes one or more handles. In another example, one or more of the RDF statements includes one or more handles that are directly related to a ranking of data values (e.g., as discussed above with respect to method 100).

At stage 310, method 300 includes determining a search key set of a plurality of ranking relationships for the subject, predicate, and object of the RDF statements. In one example, the plurality of ranking relationships allow any combination of subject, predicate, and object to be utilized as a search key for a query. In another example, the plurality of ranking relationships allow less than all combinations of subject, predicate, and object to be utilized as a search key for a query. Each ranking relationship provides a structured relationship between RDF statements based on interrelationships between subject, predicate, and object. Examples of ranking relationships include, but are not limited to, a predicate/subject/object ("PSO") relationship, a subject/object/predicate ("SOP") relationship, an object/predicate/subject ("OPS") relationship, subject/predicate/object ("SPO"), predicate/object/subject ("POS"), object/subject/predicate ("OSP"), and any combinations thereof. Any combination of ranking relationships can be established based on a desired ability to provide search keys for the subject, predicate, and object locations of RDF statements. In one example, a search key set includes at least two ranking relationships for RDF statements. In another example, a search key set includes at least three ranking relationships for RDF statements. In one such example, a search key set includes a PSO ranking relationship, a SOP ranking relationship, and an OPS ranking relationship. In another such example, a search key set includes a SPO ranking relationship, a POS ranking relationship, and an OSP ranking relationship. In one exemplary aspect, using at least three ranking relationships can allow any combination of subject, predicate, and object to be utilized as a search key for a query. In another exemplary aspect, a ranking relationship may be a balanced relationship that arranges the RDF statements in a balanced ordering. One such example includes the use of a balanced tree-structured ranking relationship (e.g., one based on a Red-Black Tree organization).

At stage 315, method 300 includes generating a single nodal index having a node for each of the RDF statements being indexed. Each node includes an identifier for the node, and a representation of the RDF statement. The representation of an RDF statement may include a URI data value, a literal data value, other data value, an arbitrarily assigned handle, a handle assigned based on the ranking of the data value, and any combinations thereof. At stage 320, each node is assigned a rank tracking indicator for each of the plurality of ranking relationships. Each rank indicator provides position indicators that provide the relative position of the corresponding RDF statement amongst the other RDF statements being indexed for the corresponding ranking relationship. A position indicator includes an indicator of the RDF statement's node that occurs at a location prior (e.g., immediately prior or prior to that) to the current RDF statement's node in the ranking relationship and an indicator of the RDF statement's node that occurs at a location after (e.g., immediately after or after that) the current RDF statement's node in the ranking relationship.

Figure 4:
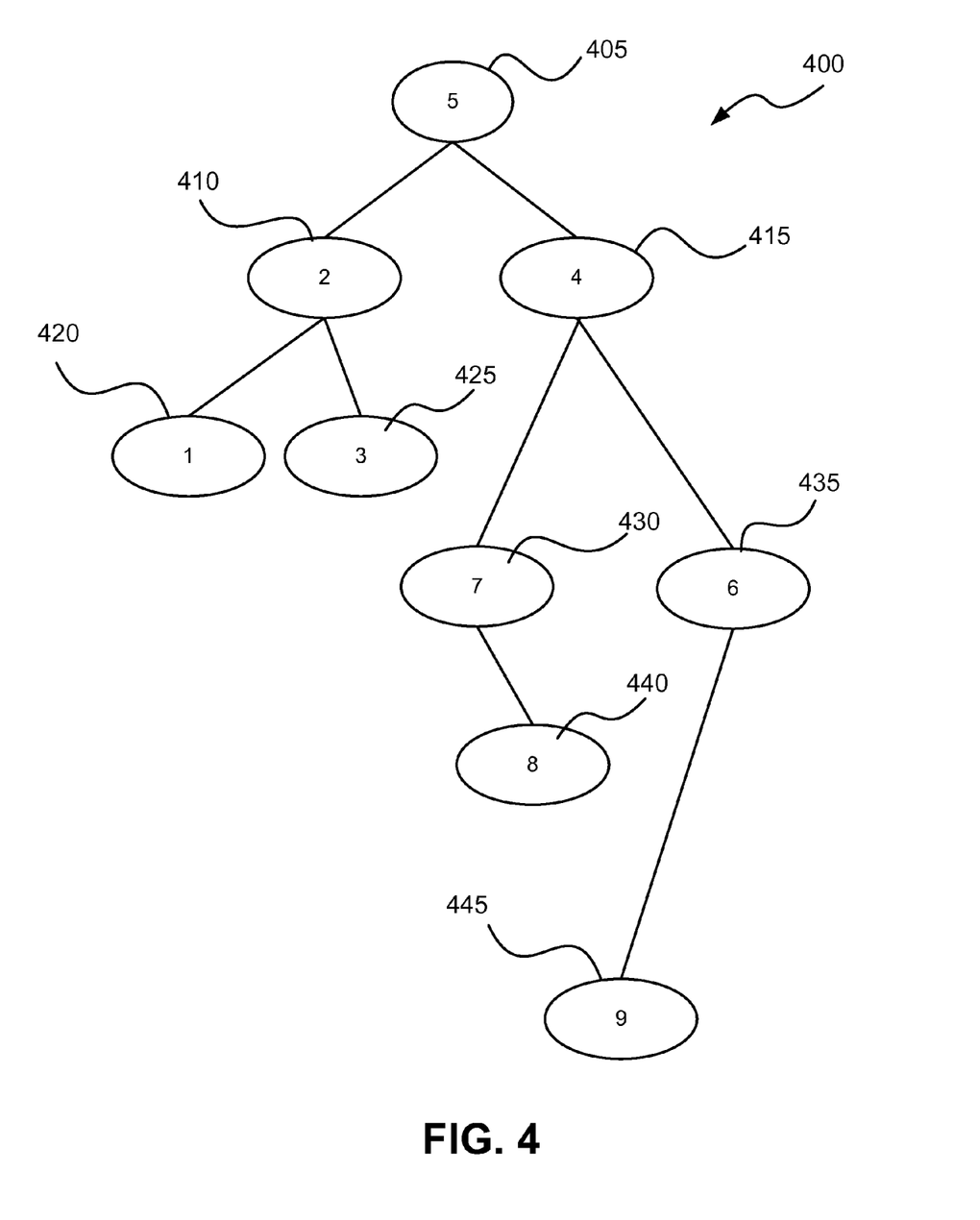
FIG. 4 illustrates an exemplary SPO ranking relationship for RDF statements using a Nodal ID as a shortcut representation of each RDF statement node.
Figure 5:
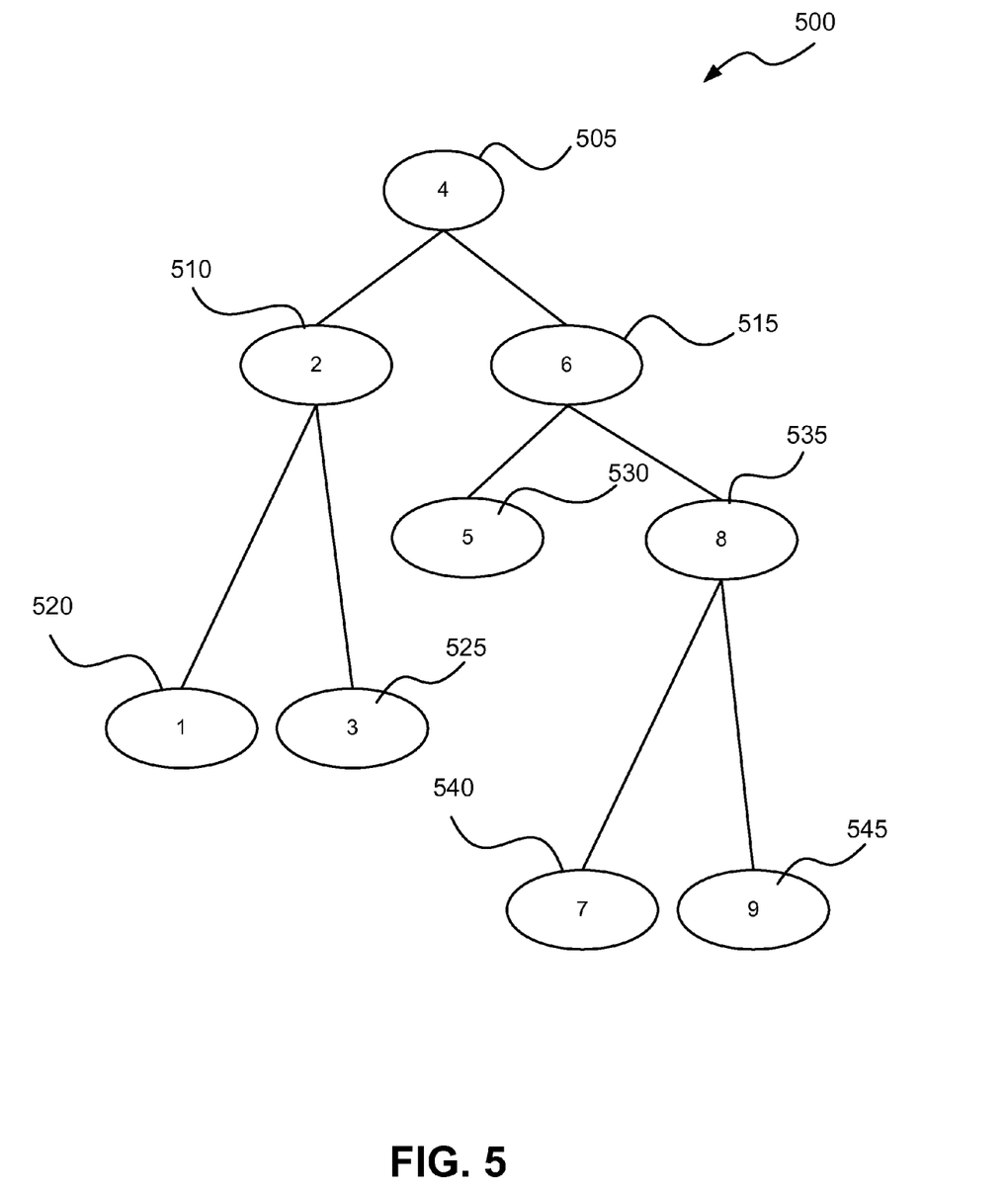
FIG. 5 illustrates an exemplary POS ranking relationship for RDF statements using a Nodal ID as a shortcut representation of each RDF statement node.
Figure 6:
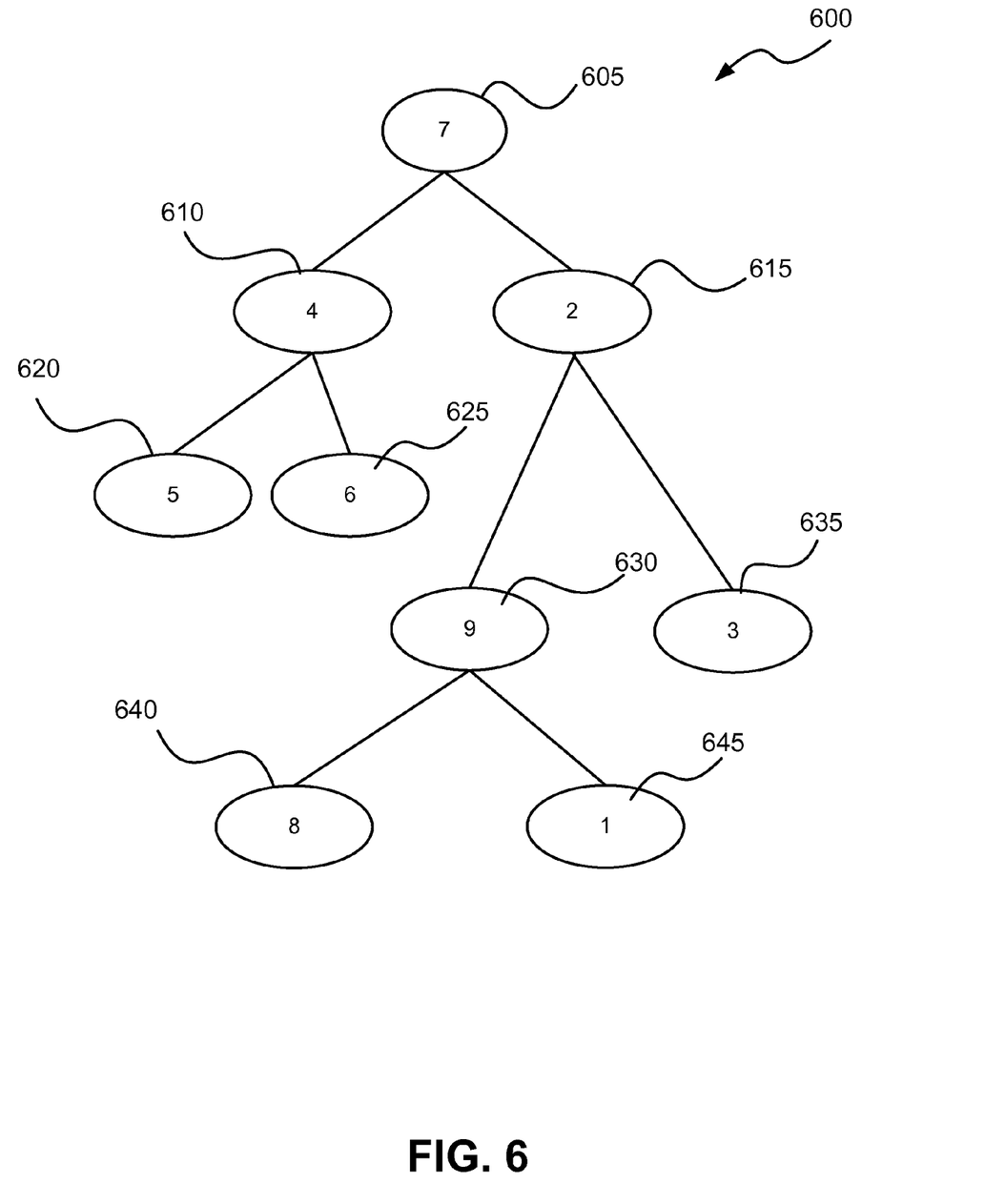
FIG. 6 illustrates an exemplary OSP ranking relationship for RDF statements using a Nodal ID as a shortcut representation of each RDF statement node.

Table 4 illustrates an example of a single nodal index for the exemplary RDF statements from Table 1. In this example, the RDF statements from Table 1 are indexed using handle values that are directly based on the ranking of data values from Table 3. The RDF statement having the subject ("S"), predicate ("P"), and object ("O") handle values 1/10/11 is located at a node with a nodal identifier of "1." The RDF statements having SPO handle values of 2/10/11; 3/10/11; 7/12/1; 4/13/1; 9/14/1; 5/15/2; 6/16/2; and 8/17/3 are located at nodes 2 to 9, respectively. Table 4 also includes for each node rank indicators for each of three ranking relationships (SPO, POS, and OSP) for the RDF statements. FIGS. 4 to 6 illustrate exemplary balanced tree ranking relationships for each of the SPO, POS, and OSP ranking relationships for the RDF statements of Table 4. As will be understood by those of ordinary skill, differently structured balanced tree relationships can be constructed for the same set of RDF statements for a given type of ranking relationship. One example of a well balanced tree ranking relationship is an exemplary tree ranking relationship that is generated using a Red-Black Tree arrangement.

TABLE 4

Example Single Nodal Index
RDF Single Nodal Index

| Node ID | Node IDs | | | | | | Handle IDs Statement | | |
|---|---|---|---|---|---|---|---|---|---|
| | SPO Ranking Relationship | | POS Ranking Relationship | | OSP Ranking Relationship | | | | |
| | Left | Right | Left | Right | Left | Right | S | P | O |
| 1 | | | | | | | 1 | 10 | 11 |
| 2 | 1 | 3 | 1 | 3 | 9 | 3 | 2 | 10 | 11 |
| 3 | | | | | | | 3 | 10 | 11 |
| 4 | 7 | 6 | 2 | 6 | 5 | 6 | 7 | 12 | 1 |
| 5 | 2 | 4 | | | | | 4 | 13 | 1 |
| 6 | 9 | | 5 | 8 | | | 9 | 14 | 1 |
| 7 | | 8 | | | 4 | 2 | 5 | 15 | 2 |
| 8 | | | 7 | 9 | | | 6 | 16 | 2 |
| 9 | | | | | 8 | 1 | 8 | 17 | 3 |

FIG. 4 illustrates an SPO ranking relationship 400 for the RDF statements using the Nodal ID from Table 4 as a shortcut representation of each RDF statement node. Ranking relationship 400 includes RDF statement node 5 as the root node 405. A node prior to node 5 in the SPO ranking relationship is RDF statement node 410 with Nodal ID of 2 (typically shown in tree structures as the left child node). A node after node 5 in the SPO ranking relationship is RDF statement node 415 with Nodal ID of 4 (typically shown in tree structures as the right child node). A node prior to node 410 in the SPO ranking relationship is RDF statement node 420 with Nodal ID of 1. A node after node 410 in the SPO ranking relationship is RDF statement node 425 with Nodal ID of 3. Each of nodes 420 and 425 do not have child nodes in ranking relationship 400. A node prior to node 415 in the SPO ranking relationship is RDF statement node 430 with Nodal ID of 7. A node after node 415 in the SPO ranking relationship is RDF statement node 435 with Nodal ID of 6. Node 430 has a node after it in the SPO ranking relationship at node 440 (Nodal ID of 8), but has no child node occurring prior to it in the SPO ranking relationship. Node 435 has a node before it in the SPO ranking relationship at node 445 (Nodal ID of 9), but has no child node occurring after it in the SPO ranking relationship.

FIG. 5 illustrates a POS ranking relationship 500 for the RDF statements using the Nodal ID from Table 4 as a shortcut representation of each RDF statement node. Ranking relationship 500 includes RDF statement Nodal ID 4 as the root node 505. A node prior to node 4 in the POS ranking relationship is RDF statement node 510 with Nodal ID of 2. A node after node 4 in the POS ranking relationship is RDF statement node 515 with Nodal ID of 6. A node prior to node 510 in the POS ranking relationship is RDF statement node 520 with Nodal ID of 1. A node after node 510 in the POS ranking relationship is RDF statement node 525 with Nodal ID of 3. Each of nodes 520 and 525 do not have child nodes in ranking relationship 500. A node prior to node 515 in the POS ranking relationship is RDF statement node 530 with Nodal ID of 5. A node after node 515 in the POS ranking relationship is RDF statement node 535 with Nodal ID of 8. Node 530 has no children nodes. Node 535 has a node before it in the POS ranking relationship at node 540 (Nodal ID of 7) and a node after it in the POS ranking relationship at node 545 (Nodal ID of 9). Nodes 540 and 545 do not have children nodes.

FIG. 6 illustrates a OSP ranking relationship 600 for the RDF statements using the Nodal ID from Table 4 as a shortcut representation of each RDF statement node. Ranking relationship 600 includes RDF statement Nodal ID 7 as the root node 605. A node prior to node 7 in the OSP ranking relationship is RDF statement node 610 with Nodal ID of 4. A node after node 7 in the OSP ranking relationship is RDF statement node 615 with Nodal ID of 2. A node prior to node 610 in the OSP ranking relationship is RDF statement node 620 with Nodal ID of 5. A node after node 610 in the OSP ranking relationship is RDF statement node 625 with Nodal ID of 6. Each of nodes 620 and 625 do not have child nodes in ranking relationship 600. A node prior to node 615 in the OSP ranking relationship is RDF statement node 630 with Nodal ID of 9. A node after node 615 in the OSP ranking relationship is RDF statement node 635 with Nodal ID of 3. Node 630 has a node before it in the OSP ranking relationship at node 640 (Nodal ID of 8) and a node after it in the OSP ranking relationship at node 645 (Nodal ID of 1). Node 635 has no children nodes.

In a traditional balanced tree indexing scheme, each of the three ranking relationships in this example would require a separate index to be generated. Each of the separate indices would require the reiteration of a representation of the RDF statement assigned to a given location in the ranking relationship. Such an approach to indexing can use a significant amount of storage and computing resources in managing the multiple indices.

Method 300 utilizes a single nodal index and includes a rank indicator for each ranking relationship with position indicators for each node for each ranking relationship. Each rank indicator includes a left pointing position indicator and a right pointing position indicator. RDF node 1 has rank indicators that have no values. This indicates that RDF statement 1/10/11 has no child nodes in either direction for any of the SPO, POS, OSP ranking relationships. RDF node 2 has a rank indicator for each of the SPO, POS, and OSP ranking relationships, including a left pointing position indicator for the SPO ranking relationship that points to Nodal ID "1," a right pointing position indicator for the SPO ranking relationship that points to Nodal ID "3," a left pointing position indicator for the POS ranking relationship that points to Nodal ID "1," a right pointing position indicator for the POS ranking relationship that points to Nodal ID "3," a left pointing position indicator for the OSP ranking relationship that points to Nodal ID "9," and a right pointing position indicator for the OSP ranking relationship that points to Nodal ID "3." RDF node 3 has rank indicators that have no values. RDF node 4 has a rank indicator for each of the SPO, POS, and OSP ranking relationships, including a left pointing position indicator for the SPO ranking relationship that points to Nodal ID "7," a right pointing position indicator for the SPO ranking relationship that points to Nodal ID "6," a left pointing position indicator for the POS ranking relationship that points to Nodal ID "2," a right pointing position indicator for the POS ranking relationship that points to Nodal ID "6," a left pointing position indicator for the OSP ranking relationship that points to Nodal ID "5," and a right pointing position indicator for the OSP ranking relationship that points to Nodal ID "6." RDF node 5 has a rank indicator for each of the SPO, POS, and OSP ranking relationships, including a left pointing position indicator for the SPO ranking relationship that points to Nodal ID "2," a right pointing position indicator for the SPO ranking relationship that points to Nodal ID "4." The POS and OSP rank indicators have no values (no child relationships). RDF node 6 has a rank indicator for each of the SPO, POS, and OSP ranking relationships, including a left pointing position indicator for the SPO ranking relationship that points to Nodal ID "9," a right pointing position indicator for the SPO ranking relationship that having no value; a left pointing position indicator for the POS ranking relationship that points to Nodal ID "5," a right pointing position indicator for the POS ranking relationship that points to Nodal ID "8." The OSP rank indicator has no values (no child node relationships). RDF node 7 has a rank indicator for each of the SPO, POS, and OSP ranking relationships, including a right pointing position indicator for the SPO ranking relationship that points to Nodal ID "8," a left pointing position indicator for the OSP ranking relationship that points to Nodal ID "4," a right pointing position indicator for the OSP ranking relationship that points to Nodal ID "2." Other position indicators have no values. RDF node 8 has a rank indicator for each of the SPO, POS, and OSP ranking relationships, including a left pointing position indicator for the POS ranking relationship that points to Nodal ID "8," a right pointing position indicator for the POS ranking relationship that points to Nodal ID "9." Other position indicators have no values. RDF node 9 has a rank indicator for each of the SPO, POS, and OSP ranking relationships, including a left pointing position indicator for the POS ranking relationship that points to Nodal ID "8," a right pointing position indicator for the POS ranking relationship that points to Nodal ID "1." Other position indicators have no values.

In one exemplary aspect, the single nodal index as described by method 300 may provide a more efficient mechanism for optimizing data recovery (e.g., by utilizing fewer memory resources than multiple indexes for the same RDF statements and/or providing a single index for application of a query).

Figure 7:
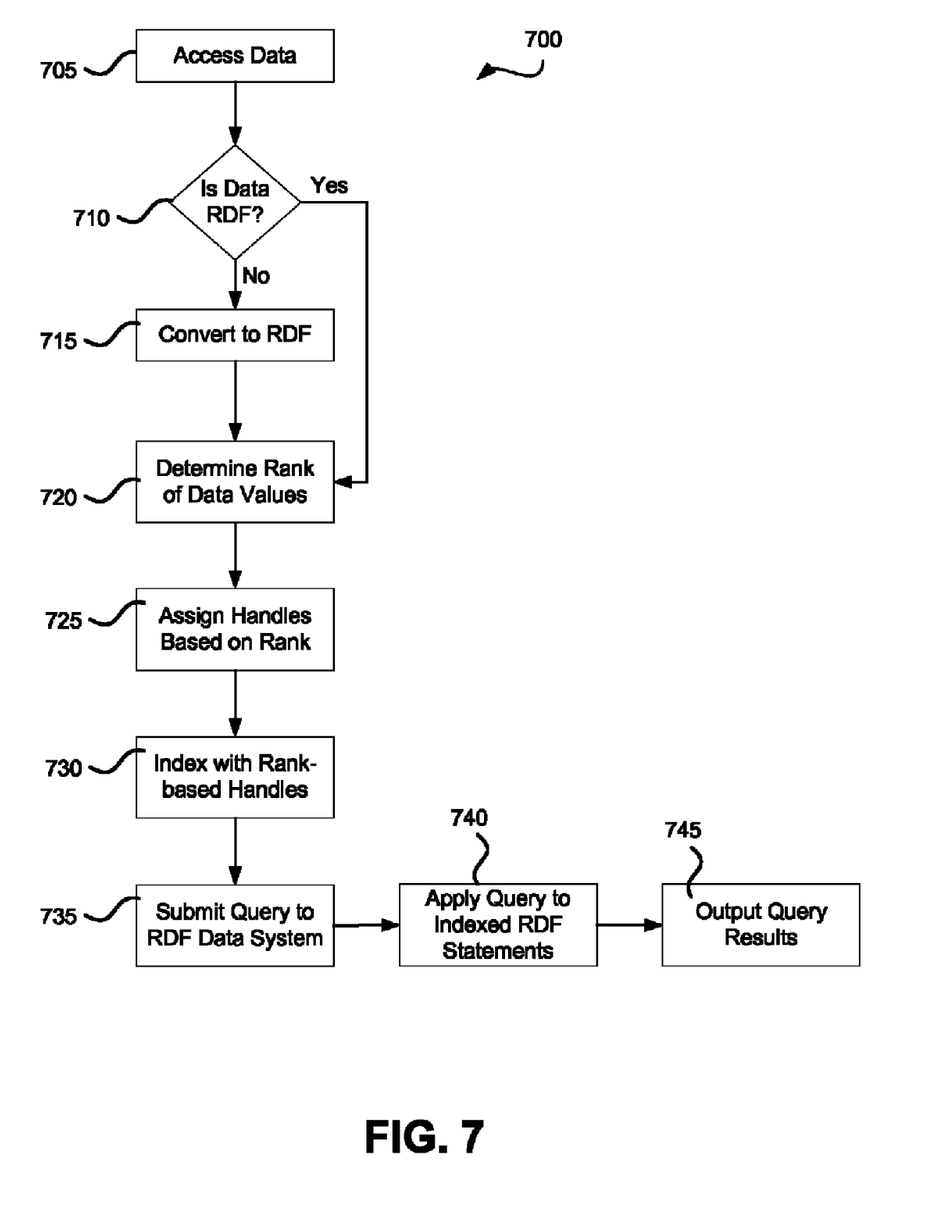
FIG. 7 illustrates another exemplary implementation of a method of optimizing data recovery in an RDF environment.

FIG. 7 illustrates another implementation of aspects of a method 700 for optimizing data recovery in an RDF environment. At stage 705 data is accessed using an RDF data system, such as the RDF data system described with respect to FIG. 2. At stage 710, if the data is not in the desired RDF format, it is converted to the desired RDF format at stage 715. In one example, such a conversion may be accomplished using an appropriately configured RDF statement processor, such as RDF statement processor 205 of FIG. 2. At stage 720, one or more of the data values of the RDF statements are ranked. At stage 725, handles are assigned to the ranked data values based on rank. Handles may also be assigned to unranked data values as discussed above. In one example, data value ranking and handle assignment may be accomplished using an appropriately configured RDF statement processor, such as RDF statement processor 205 of FIG. 2. At stage 730, the RDF statements are indexed using the assigned handles. In one example, indexing of RDF statements with rank-based handles may be accomplished with an appropriately configured indexing processor, such as indexing processor 225 of FIG. 2. At stage 735, a query is submitted to the RDF data system via a query processor, such as query processor 230 of FIG. 2. At stage 740, the query is applied to the indexed RDF statements. At stage 745, results from the query are returned. In one example, the query results are presented to a user of the RDF data system using a display device and/or one or more peripheral output devices. In one exemplary aspect, the RDF statements are organized in the index based on the handle values, which directly represent the ranking of the corresponding data values. The higher ranked RDF statements appear higher in the index such that they can be accessed by a query first and returned more quickly in a query result. In one example, a partial evaluation of a query (e.g., one that returns fewer than all of the possible solutions to a query) will have the higher ranked results and may possibly (based on the higher ranking) provide more relevant results to the query than would be the case if the higher ranking RDF statements were not returned first in the query.

Figure 8:
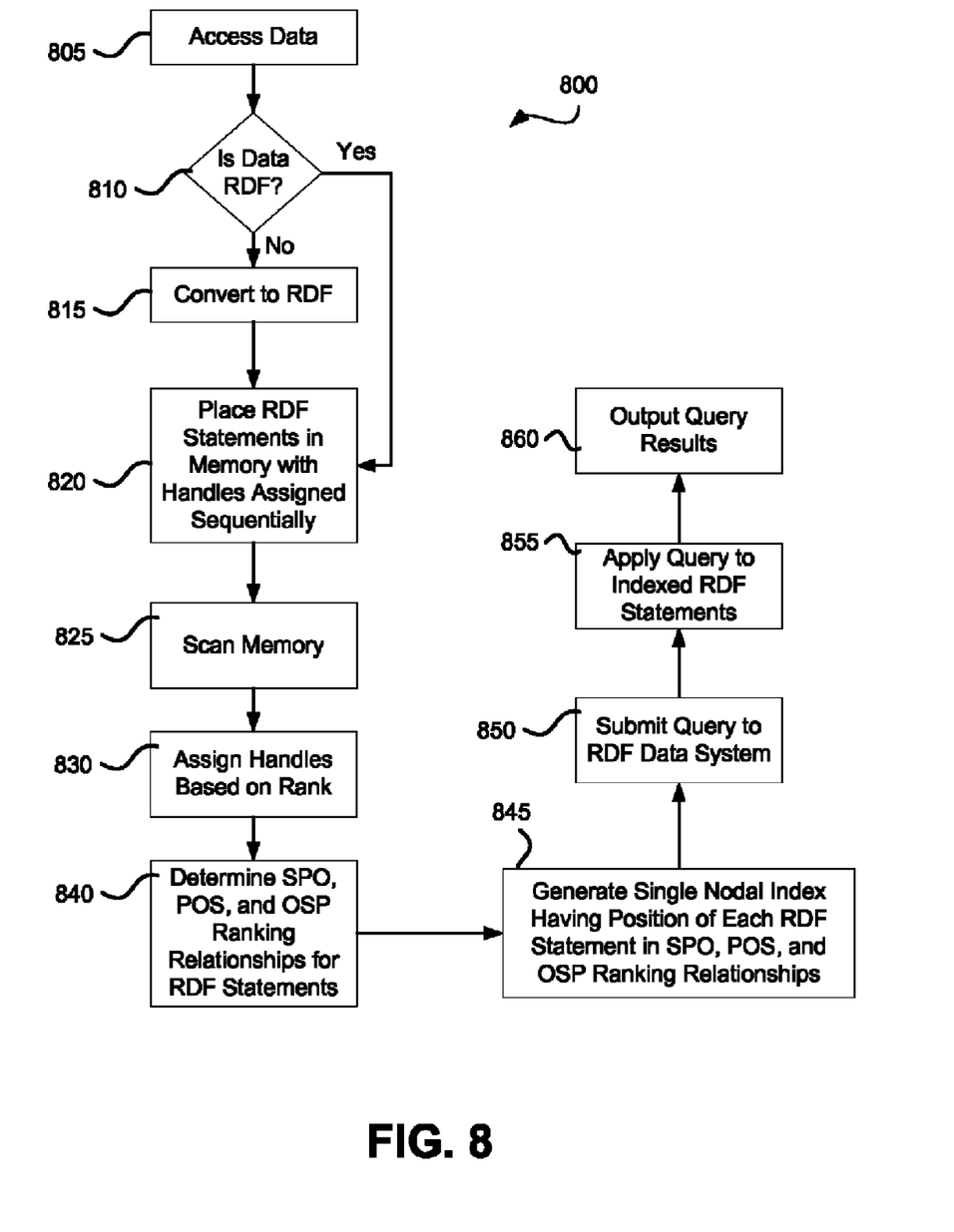
FIG. 8 illustrates yet another exemplary implementation of a method of optimizing data recovery in an RDF environment.

FIG. 8 illustrates yet another implementation of aspects of a method 800 for optimizing data recovery in an RDF environment. At stage 805, data is accessed using an RDF data system as described above. At stage 810, if the data is not in the desired RDF format, it is converted to the desired RDF format at stage 815. At stage 820, the RDF statements are placed into a memory with handles assigned to one or more of the data values of each RDF statement incrementally as placed in the memory. In one example, the RDF statements are organized in an index in the memory. In another example, the RDF statements are organized in a table. At stage 825, the memory is scanned for the data values and/or handle values of the RDF statements. At stage 830, new handles are assigned to the data values based on a ranking as discussed above. At stage 840, SPO, POS, and OSP ranking relationships are determined for the RDF statements. For example, an SPO ranking relationship may be determined ordering the RDF statements with higher ranking subject handles first, within each subject ordering the higher ranking predicate handles first, and within each predicate ordering the higher ranking objects first. A similar ordering may be utilized for the POS and OSP ranking relationships. It is noted that although this example utilizes SPO, POS, and OSP ranking relationships in a search key set, a search key set may utilize other combinations of ranking relationships. At stage 845, a single nodal index is generated for the RDF statements. The single nodal index includes a single node for each RDF statement. The single node includes a representation of the RDF statement (e.g., with handles, URI's, and/or literal values), a node identifier, and a ranking indicator for each of the SPO, POS, and OSP ranking relationships. Each of the rank indicators provides information relating to the relative position of the RDF statement to other RDF statements in the corresponding ranking relationship. In one exemplary aspect, the single nodal index may provide a more efficient use of computing resources such as memory and other storage (e.g., the integrated single nodal index may utilize less memory resources than three separate indices each for SPO, POS, and OSP ranking relationships that would require reiteration of the representation of RDF statements). In one example, a new memory structure is utilized for stages 830 to 845. In one such example, a new handle library is generated and a new index is generated, leaving the original arrangement of RDF statements from stage 820 in tact. In another example, the single nodal index of stage 845 replaces the arrangement of RDF statements from stage 820.

At stage 850, a query is submitted to the RDF data system. At stage 855, the query is applied to the indexed RDF statements. In one exemplary aspect, the ranking of RDF statements based on ranked handles may improve the speed and efficacy of the query process. In another exemplary aspect, higher ranked RDF statements located higher in the relative index to other RDF statements can be accessed first in a query and possibly provide more relevant query results. In one example, if a predicate and object are known, the predicate and object may form a search key submitted as a query to an RDF data system. In such an example, where the POS ranking relationship has been ranked based on ranked handle values, the RDF statements matching the search key for P and O will be ordered in the POS ranking relationship with subjects that have a higher ranking (based on the ranking of the data values and assignment of the handles based on rank) appearing higher in the POS ranking relationship. These RDF statements can be accessed first in the query, possibly returning more relevant results more quickly. At stage 860, results from the query are returned. In one example, the query results are presented to a user of the RDF data system using a display device and/or one or more peripheral output devices.

It is to be noted that the aspects and embodiments described herein may be conveniently implemented using one or more machines (e.g., one or more computing devices that are part of a resource description framework system) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art.

Such software may be a computer program product that employs a machine-readable medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

FIG. 9 shows a diagrammatic representation of one embodiment of a computing device in the exemplary form of a computer system 900 within which a set of instructions for causing the device to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 900 includes a processor 905 and a memory 910 that communicate with each other, and with other components, via a bus 915. Bus 915 may include any of several types of bus structures including, but not limited to, a memory bus, a memory controller, a peripheral bus, a local bus, and any combinations thereof, using any of a variety of bus architectures.

Memory 910 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 920 (BIOS), including basic routines that help to transfer information between elements within computer system 900, such as during start-up, may be stored in memory 910. Memory 910 may also include (e.g., stored on one or more machine-readable media) instructions (e.g., software) 925 embodying any one or more of the aspects and/or methodologies of the present disclosure. In another example, memory 910 may further include any number of program modules including, but not limited to, an operating system, one or more application programs, other program modules, program data, and any combinations thereof.

Computer system 900 may also include a storage device 930. Examples of a storage device (e.g, storage device 930) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 930 may be connected to bus 915 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 930 may be removably interfaced with computer system 900 (e.g., via an external port connector (not shown)). Particularly, storage device 930 and an associated machine-readable medium 935 may provide nonvolatile and/or volatile storage of machine-readable instructions, data structures, program modules, and/or other data for computer system 900. In one example, software 925 may reside, completely or partially, within machine-readable medium 935. In another example, software 925 may reside, completely or partially, within processor 905.

Computer system 900 may also include an input device 940. In one example, a user of computer system 900 may enter commands and/or other information into computer system 900 via input device 940. Examples of an input device 940 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 940 may be interfaced to bus 915 via any of a variety of interfaces (not shown) including, but not limited to, a serial interface, a parallel interface, a game port, a USB interface, a FIREWIRE interface, a direct interface to bus 915, and any combinations thereof.

A user may also input commands and/or other information to computer system 900 via storage device 930 (e.g., a removable disk drive, a flash drive, etc.) and/or a network interface device 945. A network interface device, such as network interface device 945 may be utilized for connecting computer system 900 to one or more of a variety of networks, such as network 950, and one or more remote devices 955 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 950, may employ a wired and/or a wireless mode of communication. In general, any network topology may be used. Information (e.g., data, software 925, etc.) may be communicated to and/or from computer system 900 via network interface device 945.

Computer system 900 may further include a video display adapter 960 for communicating a displayable image to a display device, such as display device 965. Examples of a display device include, but are not limited to, a liquid crystal display (LCD), a cathode ray tube (CRT), a plasma display, and any combinations thereof. In addition to a display device, a computer system 900 may include one or more other peripheral output devices including, but not limited to, an audio speaker, a printer, and any combinations thereof. Such peripheral output devices may be connected to bus 915 via a peripheral interface 970. Examples of a peripheral interface include, but are not limited to, a serial port, a USB connection, a FIREWIRE connection, a parallel connection, and any combinations thereof. Query results from a resource description framework system as described herein may be presented via video display adapter 960 and/or one or more other peripheral output devices.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computer implemented method of indexing a resource description framework data system, the method comprising:
    identifying a plurality of resource description framework data statements to be indexed within a resource description framework data system;
    determining a search key set of a plurality of ranking relationships for the subject, predicate, and object for the plurality of resource description framework data statements;
    generating a single nodal index including a node for each of the plurality of resource description framework data statements, each node including an identifier of the node, and
    assigning to each node of the single nodal index a plurality of rank tracking indicators, the plurality of rank tracking indicators for each node including a position indicator for each of the plurality of ranking relationships, each of the position indicators representing the relative position of the corresponding resource description framework data statement in the corresponding ranking relationship, the single nodal index including the relative position of each node in all of the plurality of ranking relationships in the search key set.

2. A method according to claim 1, wherein each of the position indicators includes a left child node indicator and a right child node indicator.

3. A method according to claim 1, wherein the plurality of ranking relationships includes two or more ranking relationships selected from the group consisting of a subject-predicate-object ranking relationship, a predicate-object-subject ranking relationship, an object-subject-predicate ranking relationship, and any combinations thereof.

4. A method according to claim 1, wherein each node includes a representation of one of the plurality of resource description framework data statements.

5. A method according to claim 4, wherein each representation of one of the plurality of resource description framework data statements includes one or more of a uniform resource identifier, a literal data value, an randomly assigned handle, and a handle assigned based on a ranking of the data values of the plurality of resource description framework data statements that are ranked.

6. A method according to claim 4, wherein each representation of one of the plurality of resource description framework data statements includes a handle assigned based on a ranking of the data values of the plurality of resource description framework data statements that are ranked.

7. A method according to claim 1, further comprising:
    ranking the occurrence of data values across one or more of the subject data values, predicate data values, and object data values for the plurality of resource description framework data statements;
    assigning a handle to one or more of the ranked data values, the handle replacing each of the ranked data values with a shortcut value that utilizes less storage space than the corresponding data value, each shortcut value representing the rank of the corresponding data value relative to the ranked data values in the resource description framework data system;
    storing each handle in a library with an indication of the corresponding data value; and
    indexing the plurality of resource description framework data statements in an ordered index, the ranked data values of each of the plurality of resource description framework data statements being replaced in the ordered index with the corresponding handle.

8. A method according to claim 7, wherein each node of the single nodal index includes a representation of one of the plurality of resource description framework data statements, the representation including one or more of the handles that corresponds with the represented resource description framework data statement.

9. A method according to claim 7, wherein said ranking includes ranking the frequency of occurrence of subject data values in a predicate and/or object of other resource description framework data statements.

10. A method according to claim 7, wherein said indexing includes a self balancing binary search tree process.

11. A method according to claim 1, further comprising converting data that is not in the form of a resource description framework data statement into a resource description framework data statement form prior to said identifying.

12. A method according to claim 1, further comprising:
    submitting a query to the resource description framework data system;
    applying the query to the single nodal index;
    using the single nodal index to return a set of results for the query via an output device.

13. A machine readable storage medium containing machine executable instructions for implementing a method of indexing a resource description framework data system, the instructions comprising:
    a set of instructions for identifying a plurality of resource description framework data statements to be indexed within a resource description framework data system;
    a set of instructions for determining a search key set of a plurality of ranking relationships for the subject, predicate, and object for the plurality of resource description framework data statements;
    a set of instructions for generating a single nodal index including a node for each of the plurality of resource description framework data statements, each node including an identifier of the node, and
    a set of instructions for assigning to each node of the single nodal index a plurality of rank tracking indicators, the plurality of rank tracking indicators for each node including a position indicator for each of the plurality of ranking relationships, each of the position indicators representing the relative position of the corresponding resource description framework data statement in the corresponding ranking relationship, the single nodal index including the relative position of each node in all of the plurality of ranking relationships in the search key set.

14. A machine readable storage medium according to claim 13, wherein each of the position indicators includes a left child node indicator and a right child node indicator.

15. A machine readable storage medium according to claim 13, wherein the plurality of ranking relationships includes two or more ranking relationships selected from the group consisting of a subject-predicate-object ranking relationship, a predicate-object-subject ranking relationship, an object-subject-predicate ranking relationship, and any combinations thereof.

16. A machine readable storage medium according to claim 13, wherein each node includes a representation of one of the plurality of resource description framework data statements.

17. A machine readable storage medium according to claim 16, wherein each representation of one of the plurality of resource description framework data statements includes one or more of a uniform resource identifier, a literal data value, an randomly assigned handle, and a handle assigned based on a ranking of the data values of the plurality of resource description framework data statements that are ranked.

18. A machine readable storage medium according to claim 16, wherein each representation of one of the plurality of resource description framework data statements includes a handle assigned based on a ranking of the data values of the plurality of resource description framework data statements that are ranked.

19. A machine readable storage medium according to claim 13, further comprising:
   a set of instructions for ranking the occurrence of data values across one or more of the subject data values, predicate data values, and object data values for the plurality of resource description framework data statements;
   a set of instructions for assigning a handle to one or more of the ranked data values, the handle replacing each of the ranked data values with a shortcut value that utilizes less storage space than the corresponding data value, each shortcut value representing the rank of the corresponding data value relative to the ranked data values in the resource description framework data system;
   a set of instructions for storing each handle in a library with an indication of the corresponding data value; and
   a set of instructions for indexing the plurality of resource description framework data statements in an ordered index, the ranked data values of each of the plurality of resource description framework data statements being replaced in the ordered index with the corresponding handle.

20. A machine readable storage medium according to claim 19, wherein said set of instructions for ranking includes a set of instructions for ranking the frequency of occurrence of subject data values in a predicate and/or object of other resource description framework data statements.

21. A machine readable storage medium according to claim 19, wherein said set of instructions for indexing includes a set of instructions for a self balancing binary search tree process.

22. An indexing system for indexing a resource description framework data system, the indexing system comprising:
   means for identifying a plurality of resource description framework data statements to be indexed within a resource description framework data system;
   means for determining a search key set of a plurality of ranking relationships for the subject, predicate, and object for the plurality of resource description framework data statements;
   means for generating a single nodal index including a node for each of the plurality of resource description framework data statements, each node including an identifier of the node, and
   means for assigning to each node of the single nodal index a plurality of rank tracking indicators, the plurality of rank tracking indicators for each node including a position indicator for each of the plurality of ranking relationships, each of the position indicators representing the relative position of the corresponding resource description framework data statement in the corresponding ranking relationship, the single nodal index including the relative position of each node in all of the plurality of ranking relationships in the search key set.

* * * * *